US006636055B2

(12) United States Patent
Camarasa et al.

(10) Patent No.: US 6,636,055 B2
(45) Date of Patent: Oct. 21, 2003

(54) MULTIFREQUENCY EQUIPMENT FOR SENSING THE STATE OF ELECTRODES IN ELECTRIC-ARC FURNACES

(75) Inventors: Javier Bullon Camarasa, La Coruna (ES); Angel Lorenzo Barreiro, La Coruna (ES); Jose Farina Rodriguez, Vigo (ES); Juan Jose Rodriguez Andina, Vigo (ES)

(73) Assignee: Ferroatlantica, S.A., Arteixo (ES)

( * ) Notice: Subject to any disclaimer, the term of this patent is extended or adjusted under 35 U.S.C. 154(b) by 41 days.

(21) Appl. No.: 09/982,536

(22) Filed: Oct. 19, 2001

(65) Prior Publication Data

US 2002/0047718 A1 Apr. 25, 2002

(30) Foreign Application Priority Data

Oct. 19, 1999 (ES) .......................................... 200002509

(51) Int. Cl.$^7$ .............................................. G01R 27/08
(52) U.S. Cl. ....................................... 324/718; 324/717
(58) Field of Search ................................. 373/105, 106, 373/102; 324/444, 445, 449, 700, 703, 707, 709, 713, 717, 718

(56) References Cited

U.S. PATENT DOCUMENTS

| 4,324,944 | A | * | 4/1982 | Weihrich et al. | ............. 373/105 |
| 4,388,108 | A | * | 6/1983 | Rozenberg et al. | ......... 75/10.62 |
| 4,677,643 | A | * | 6/1987 | Dicks | .......................... 373/105 |
| 5,583,883 | A | * | 12/1996 | Paulsson et al. | ............. 373/102 |

\* cited by examiner

*Primary Examiner*—N. Le
*Assistant Examiner*—Vincent Q. Nguyen
(74) *Attorney, Agent, or Firm*—Dennison, Schultz & Dougherty

(57) ABSTRACT

Apparatus and method for sensing the state of electrodes during baking to obtain an indication of the internal condition of the electrodes where changes of phase are being produced. The apparatus includes a conductor disposed within the electode material during baking, an external, low power, variable frequency electric generator connected to the conductor, and means for analyzing a response signal, especially impedance of the response signal upon changing the frequency of the electric current, to determine the condition of the electrode along its height.

13 Claims, 1 Drawing Sheet

MULTIFREQUENCY EQUIPMENT FOR SENSING THE STATE OF ELECTRODES IN ELECTRIC-ARC FURNACES

BACKGROUND OF THE INVENTION

In electric arc reduction furnaces, the electrodes an essential component, through which electric energy is conducted, triggering the electric arc in the lower part and producing a temperature sufficient that chemical reduction may occur in the furnace.

The electric current is introduced to the electrode by means of the contact plates or plows, generally more than one, that are pressed against the electrode itself by means of pressure rings or crowns. The plates are normally made of copper and the pressure rings may be of copper or another material and both are usually strongly cooled with water.

Usually, the electrodes are made of carbon in its different forms. They are consumed in the arc area as the reaction is produced in the furnace and they are replaced through the upper part of the column. They may be classified as prebakes, when they have been prepared already baked and machined outside the reduction furnace, or they may be self-baked in the furnace itself, in which case the raw material to be baked will be introduced in the upper part of the column and will bake as it descends therealong.

The paste before baking is known as green paste and is mixture of different types of carbons limed at high temperatures with pitches which act as binders. This green paste is usually supplied as briquettes or cylinders with a smaller diameter than that of the electrode itself which is to be introduced through the upper part of the column. As the temperature increases, the softening point of the paste is reached, from which the paste becomes liquid and tends to fill all the gaps and uniformly be distributed in a horizontal section of the electrode column.

To permit this baking, the electrode column should be provided with a metal hoop, generally cylindrical with a specific diameter depending on the furnace type. The purpose of this hoop is to facilitate the electrode formation acting as a container during the phase changes of the carbon paste is introduced inside it.

Although the object of the invention may be applied to any type of electric conduction involving a change of phase in the raw material of an electrode, the specific application of this invention has been made for carbon paste electrodes used in submerged electric arc furnaces for the production of ferroalloys. Another application would be in the manufacture of the electrodes themselves when they are baked outside the furnace or in any other type of production such as vats for the manufacture of aluminum.

The resistance values of the paste on passing the current may vary considerably, depending on whether it is in a green state with many gaps between the parts or if it is liquefied and then baked. In all these processes, volatile gases are produced and cokification of the pitch occurs, so that when the corresponding temperature is reached, the electrode is a highly conductive carbon mass with a shape determined by the hoop itself.

All these transformations are of maximum importance to obtain a good baked electrode satisfying its function in the furnace without problems. However, they are produced along the column which has a variable length between three and ten meters and in an area where there is no access for observing or studying the baking of the paste. Several studies have been made by introducing thermocouples along the column and from whose temperature the baking state of the paste may be deduced. Mathematical models have also been made, starting from the Maxwell equations and the contour conditions of the electrode itself which indicate temperature values and even intensity along the electrode. This gives an indication as to what actually occurs inside the column, but in the daily use of furnaces it is impossible for these methods to indicate what is being produced at each moment, so that it is impossible to prevent problems of maladjustment or furnace destabilization and of the electrode itself.

Regarding the state of the art, it is known that the electrode has a core of metal, amorphous or of another type of material. Two patents may be mentioned having a graphite core, Spanish Patent number 9102414/5 issued to Ferroatlántica, directed to IMPROVEMENTS ON THE CONTINUOUS MANUFACTURING PROCESS OF IMPURITY FREE ELECTRODES AND IRON FOR ELECTRIC ARC FURNACES and U.S. Pat. No. 4,575,856 issued to J. A. Persson directed to IRON FREE SELF BAKING ELECTRODE.

SUMMARY OF THE INVENTION

It is therefore an object of the invention to provide an apparatus and method to enable determination at any moment of the condition of the paste inside the column and to detect any irregularity in paste uniformity, density or compacting that may later give problems in the electrode and in the furnace operation as a result.

To achieve this and other objects, the invention is directed to a low and known impedance conducting element introduced in the electrode center, such as the aforementioned graphite, and also copper, iron, aluminum or other good metal conductor. The conductor component will have a diameter based on the electrode diameter in a proportion generally calculated based on previous experiences, and which may be introduced through the upper part of the column, lowering through the electrode center therealong until it is melted in the lower part of the electrode and once baking of the paste has been produced, which takes place at about 500° C. The higher the melting point, more information may be obtained on the column situation. It is important that this conducting component does not contaminate the product being manufactured in the furnace.

Through this conducting component, a low power electric current is introduced having known intensity and frequency. A response signal is collected through the contact plates, closing the circuit conveying the signal to a means for analysis.

In this way, the current generated at a determined frequency and voltage will be introduced in the upper part of the electrode through the aforementioned central conductor component and will be transmitted through the central conductor until it reaches the plate, crossing the carbon paste, and from there to the copper pipe, where it closes a circuit in the equipment itself.

When this circuit is introduced in a mathematical electrode model, it can be proven that the current produced always follows the route of minimum impedance. For this reason, depending on the frequency at which the current is introduced, it will transmit more or less through the length of the central conductor and will go to the hoop or the external surface of the electrode at different heights. Through the equipment, we may know the impedance values at each one of the different frequencies and collect the signal in each one of the plates and therefore, in the entire horizontal section of the electrode. All this data is collected in a digital processor connected to a computer analyzing the different signals and shows values indicating the internal situation of the electrode.

Further information concerning the features of the invention can be obtained from the attached drawing, disclosing schematically an example representing the preferred and essential details of the invention.

BRIEF DESCRIPTION OF THE DRAWINGS

The sole drawing FIGURE is a schematic diagram of the apparatus of the invention with an electrode assembly.

DESCRIPTION OF THE PREFERRED EMBODIMENTS

Figure 1:
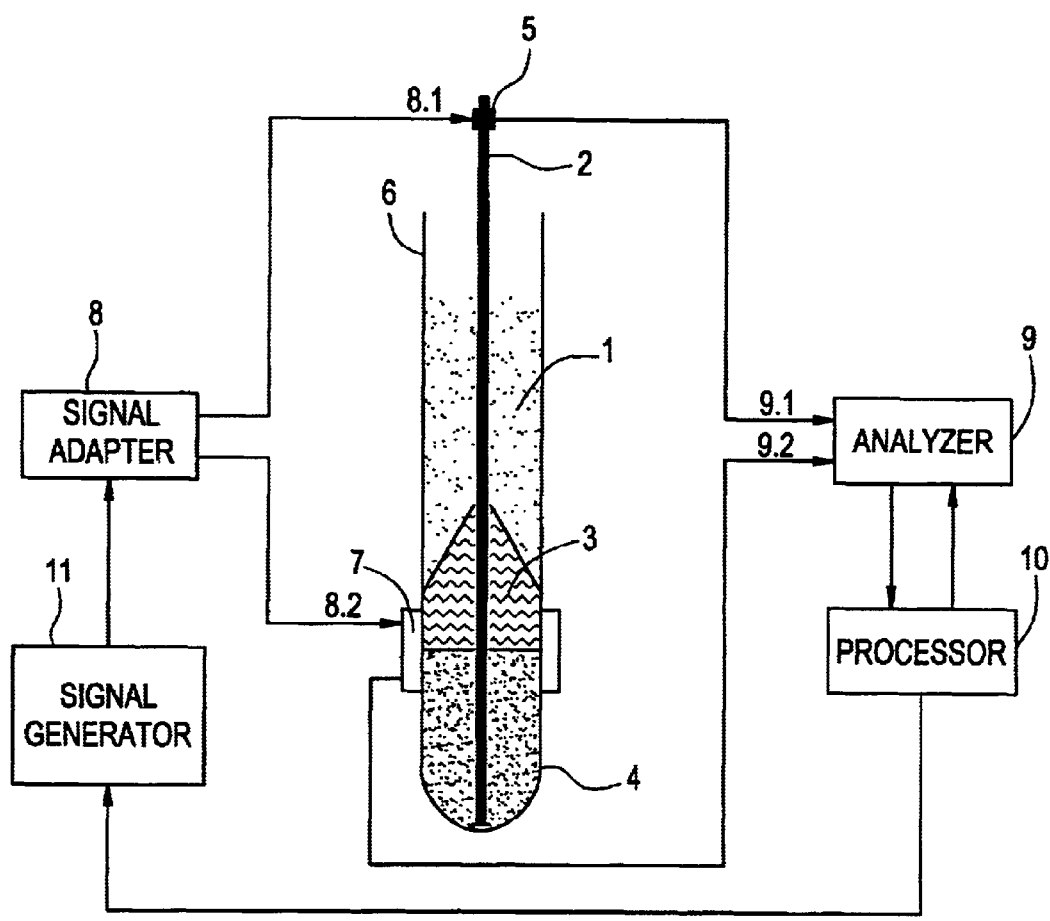

A practical example of the external arrangement of the prototype developed according to the invention is shown in the drawing FIGURE.

Thus, electrode assembly 1 includes an electric conductor core 2 of good material, co-axially arranged for the integration of the electrode through which electric current is passed in order to continuously analyze the electrode situation or its operation.

The electrode is formed by baking paste 3 around the core 2 area, as it descends along the column and utilizing heat generated by the current passing through plates 7. The paste changes its physical state from the initial solid to liquid and then to solid and baked 4 according to the temperature of each area. During the entire baking process, the paste is contained in a metallic hoop 6 favoring the process, exiting at the bottom of hoop 6 in baked form.

In the FIGURE, a signal processor 10 programs the frequency and amplitude of an excitation signal produced by generator 11 and introduces the signal in core 2 through a signal adapter 8 and the terminal 8.1, the core being connected through contacts 5 and 8.2 also connected to the plate 7. The processor 10 is also responsible for analyzing the signal received across terminals 9.1 and 9.2 of analyzer 9. From the comparison between the signal transmitted and the signal received, the electrode condition is deduced in each of its areas.

Signal processor 10 and generator 11 produce the low power electric current which typically has an intensity of about 0.1 to 10 Amperes, and a frequency of less than about 1 MHz. The output power will generally be in the range of about 5–20 Watts, preferably about 10 Watts.

Having conveniently described the nature of the invention, it is stated for the pertinent purposes that it is not limited to the exact details of this example, but on the contrary, relevant modifications may be introduced provided they do not alter the basic features thereof.

What is claimed is:

1. An apparatus for determining the condition of an electrode during baking thereof in which a change of phase occurs, comprising:

a) hoop means having open upper and lower ends and constructed and arranged to confine a paste descending therethrough during baking thereof into a predetermined shape, with baked paste exiting from the open lower end;

b) an electrical conductor disposed generally vertically within the hoop means and around which the paste bakes, said conductor having a first upper end generally above the hoop means, and a second, lower end;

c) means for generating an electrical current of low power and variable frequency;

d) an electrically conductive plate constructed and arrange for electrical contact with the electrode during baking, disposed at the lower end of the hoop means;

e) means for passing the electrical current from the generating means between the upper end of the electrical conductor and the electrically conductive plate; and f) means for analyzing an electrical signal between the upper end of the electrical conductor and the electrically conductive plate for impedance.

2. Apparatus according to claim 1, wherein the electrical conductor is graphite, copper, iron, or aluminum.

3. Apparatus according to claim 1, wherein the generating means includes means for varying the frequency of the electrical current, and the means for analysis includes a means for determining impedance of the electrode during baking along its height.

4. Apparatus according to claim 3, wherein the means for analyzing includes means for determining reaction areas along the height and general status of a container in which baking takes place.

5. Apparatus according to claim 1, wherein the generating means provides an output power of about 5 to 20 watts.

6. A method for determining the condition of an electrode during baking thereof involving a change of state, comprising the steps of:

(a) baking a material descending through hoop means from an open top end of the hoop means through an open lower end of the hoop means;

(b) disposing within the baking material a central electrical conductor which extends from above the hoop means and which is connected to a source of low power electrical current of variable frequency; and (c) analyzing impedance of a response current along said conductor.

7. Method according to claim 6, wherein the baking material is a paste which bakes during a descent down a column.

8. Method according to claim 7, wherein a conductive plate connected to the source is disposed at the lower end for making electrical contact with baked paste.

9. Method according to claim 6, wherein the frequency of the electrical current is varied, enabling determination of the condition of the electrode along its height.

10. Method according to claim 6, wherein the frequency of the electric current is less than about 1 MHz.

11. Method according to claim 6, wherein the electric current has a power of about 5 to 20 Watts.

12. Method according to claim 6, wherein the power of the electric current is about 10 Watts.

13. Method according to claim 6, wherein the electric current has an intensity of about 0.1 to 10 Amperes.

* * * * *